UNITED STATES PATENT OFFICE.

CARLETON ELLIS, OF MONTCLAIR, NEW JERSEY.

CULINARY PRODUCT.

1,372,614.     Specification of Letters Patent.     Patented Mar. 22, 1921.

No Drawing.     Application filed January 25, 1919. Serial No. 273,040.

*To all whom it may concern:*

Be it known that I, CARLETON ELLIS, a citizen of the United States, and a resident of Montclair, in the county of Essex and State of New Jersey, have invented certain new and useful Improvements in Culinary Products, of which the following is a specification.

This invention relates to edible oil compositions and has especial reference to a product containing hardened or hydrogenated oil material.

It has been proposed to make edible fats of the consistency of lard from hydrogenated oil in two ways. One manner is to hydrogenate a quantity of oil such as cottonseed oil until it is very hard and brittle and add this to ordinary cottonseed oil in such proportions as to stiffen the latter to the consistency of lard. Usually 10 to 15% of the hard brittle fat is required. The other method of making lard compound is to hydrogenate the total amount of the oil employed until it has become stiffened thoroughly to the consistency of lard. Both of these methods yield lard compounds containing considerable amounts of linolein, olein and other unsaturated components and consequently bodies which are liable to take up oxygen and change in flavor, color or some other manner. When the degree of unsaturation is measured by the iodin test as is commonly the case, it will be found that these lard substitutes have iodin numbers ranging from say 80 to 95 or thereabout which indicates the possibilities of absorption of oxygen and consequent instability. If the degree of unsaturation is measured by the heat of reaction developed with sulfuric acid the results are substantially the same. If such unsaturated fats are subjected to severe aging conditions as, for example, by being exposed to a source of strong ultraviolet light such lard substitutes become more or less gummy and unattractive in appearance in a short time. The object of the present invention is to prepare a fatty product of an edible consistency which is substantially completely hydrogenated or free from unsaturated bodies absorbing oxygen and producing rancid products by such oxidation. I preferably prepare a product having an iodin number of substantially zero, although when a fat is completely saturated with hydrogen the iodin number is not an exact criterion of complete saturation as substitution or absorption of iodin in other ways may occur, and the sulfuric acid test may therefore be employed to advantage in some cases. In any event one object is to produce a product which is substantially completely hydrogenated in contrast to the incompletely hydrogenated products referred to above which have the undesirable high iodin numbers and certain other objectionable features.

While the process of the present invention may be employed in making lard substitute I preferably apply it in the manufacture of butter substitutes or oleomargarin, especially for the manufacture of nut butters or fats intended for confectionery purposes, ice creams and the like. The preferred embodiment of the invention therefore is a butter-like fat which is quite distinct from lard substitutes or lard fat in that the butter substitute should be of a character that will melt in the mouth readily without leaving that objectionable taste or feel which is noticed on eating ordinary lard. A butter substitute should remain solid or at least of a buttery consistency in moderately warm climates and it is especially desirable to have one with a composition which does not have too sharp a melting point. A product which is solid at ordinary room temperature and becomes liquid on a very slight elevation of the temperature is not so desirable; but rather one which melts slowly and softens gradually through a considerable range of temperature. The more nearly homogeneous and blended the product the more likelihood of such a sharp melting point and in the present invention it is an object to have a considerable number of dissimilar fatty bodies present in the preferred form of composition, such for example as the various forms of stearo-palmitins and laurins and the like as may be obtained by incorporating different hydrogenated oils.

In the preferred form of invention therefore an edible product of substantially butter-like consistency and preferably of a flavor resembling or approaching butter is obtained by the incorporation of two or more, that is a plurality, of hydrogenated oils, such for example as cocoanut oil and peanut oil. These may be separately hydrogenated or they may be co-hydrogenated (that is, a mixture of the oils is subjected to the action of hydrogen in the presence of a catalyzer). Preferably a nickel catalyzer is employed in a finely divided form although other catalyzers such as palladium and the like may be employed. A temperature between 150 and 200° C. may be used and hydrogen gas may be introduced below, at, or above atmospheric pressure. Preferably the formation of lactones is avoided. The hydrogenation should be carried forward until the unsaturated components of the oil, capable of taking up hydrogen are entirely or substantially entirely changed by union with hydrogen or by hydrogenation and accompanying polymerization so that a hydrogenated or a hydrogenated and polymerized oil is produced which has taken up all the hydrogen it is capable of doing or in other words is substantially completely hydrogenated.

A desirable basis or major constituent of the fatty material is cocoanut oil or analogous fat palm kernel oil. Cocoanut oil, in its natural state, is nearly saturated with hydrogen and only a comparatively small amount of hydrogen gas is required to completely hydrogenate it. The completely hydrogenated product has a melting point of but a few degrees above the unhydrogenated fat and this melting point is not high enough ordinarily to meet the summer requirements of a nut butter. The addition of a few per cent. of completely hydrogenated oil such for example as peanut oil raises the melting point to the requisite degree. Similarly other oils may be employed such as soya bean oil, cottonseed oil, Brazil nut oil, corn oil and other animal and vegetable oils. In the preferred form of the invention, however, the composition is made from completely hydrogenated nut oil so that the product may be truly a nut butter. In order to secure the increased melting point and also the desired heterogenity of product resulting in the melting point lag or range referred to above it is oftentimes useful to incorporate more than two oils and cocoanut oil, palm kernel oil, peanut oil and Brazil nut oil may be co-hydrogenated in proportions to yield a fat of butter-like consistency.

The production of a mixture of completely hydrogenated nut oils constitutes a feature of my invention. The absence of animal fats in said oils in the preferred form of the present invention enables the special qualities of nut oils to be availed of in a concentrated form.

Another feature of the present invention is the production of a fatty product which is free from nickel. Ordinarily saturation of the oil to remove the finely divided nickel catalyzer does not suffice to remove all objectionable traces of nickel as the latter may be dissolved to a slight extent in the oil as a nickel soap or in some other form and thus will not be removed by filter pressing. This dissolved nickel may be taken out to a considerable extent at least by agitation with gelatinous silicic acid material, but preferably is subjected to superheated steam which has the effect of breaking down the nickel compound causing it to separate in a flocculent condition or other form so that it may be filtered out giving a substantially or essentially nickel-free fat. Preferably the operation of denickeling is carried out simultaneously with deodorizing as indicated in a general way in my Patent 1,043,912, issued November 12, 1912. Treatment of the oil at a high temperature with superheated steam under reduced atmospheric pressure serves to deodorize the oil as well as to precipitate nickel compound. For example, the entire mixture of hydrogenated oil material may be deodorized by treating with superheated steam at a temperature of about 210° C. and under a vacuum of about 28 to 29 inches of mercury. In place of employing superheated steam the oil may, for example, be heated somewhat higher say to 220 to 250° C. and ordinary steam blown in while employing as high a vacuum as the apparatus will permit. Thus by treatment with the ordinary steam or superheated steam in partial vacuum at these high temperatures the malodorous impurities are readily driven off, the traces of nickel are precipitated and after cooling away from the air and filtration a clean, sweet-smelling hydrogenated product is obtained without any objectionable traces of nickel in solution. This step is applicable to hydrogenated oils of various types and grades and is not necessarily limited to the butter-like composition described herein as the preferred embodiment. In deodorizing and denickeling oils which have been hydrogenated to a relatively high melting point so that they are hard and brittle at room temperature considerable trouble may be found in the operation due to foaming or priming. If the hard fat is thinned or reduced with an oil, either hydrogenated or unhydrogenated, but preferably the former, the deodorizing step may be carried out without any serious trouble from priming. For example, hydrogenated soya bean oil melting in the neighborhood of 60° C. may be mixed with at least an equal volume of hydrogenated cocoanut oil melting at say 30° C. and subjected to deodorization with ordinary steam at a temperature of 200 to 250° C. or above.

It is desirable to use as a catalyzer nickel in a metallic state and also preferably to avoid the presence of water in order to reduce the amount of nickel dissolved by the oil. Also it is desirable to start with a neutral fat and to maintain conditions such that free fatty acid does not form to any material extent during hydrogenation. If the oil is to be bleached by treatment with fullers' earth and the like it is preferably done prior to deodorization.

The production of butter substitutes or oleomargarins in accordance with the present invention may be carried out in the manner described in my Patent No. 1,038,545, issued September 17, 1912, the completely hydrogenated product may be churned with milk material to introduce the proper flavoring qualities in the oil or the latter may be acquired by the introduction of other suitable flavoring material. The present invention contemplates both the production of a butter substitute fatty stock or material which may be used in various butter compositions employing various methods to produce a desirable butter flavor and also the manufacture of finished oleomargarin or butter substitute itself to produce for example, the nut butter embodied in the preferred form of the present invention. The butter fat stock which has not been churned with milk or otherwise flavored may, if desired, in that form be employed in confectionery such for example as in the making of chocolate creams or chocolate bars and also in the production of artificial milk by the homogenizing process or for making artificial creams in like manner. The hydrogenated product also may be employed in making ice cream or in ice cream preparations or bases, which on the addition of water, afford a preparation ready to be frozen to make ice cream. For example one part of completely hydrogenated composite fat may be homogenized with one part of ordinary cream and say one part of milk in order to produce a cream preparation.

As an example of the preferred form of invention 5 lbs. of peatnut oil are mixed with 95 lbs. of cocoanut oil and are hydrogenated in the presence of nickel catalyzer until a mixture of these fats is completely saturated by the hydrogen gas so that the iodin number is in the neighborhood of zero and the product does not react with sulfuric acid giving off heat in the manner that ordinary unsaturated oils exhibit. The hydrogenated product is passed through a filter press to remove the finely divided nickel material. The product may then be agitated with some fullers' earth to bleach the oil if this is required. The bleached material is then introduced into a deodorizing receptacle and heated to somewhat over 200° C. while steam is blown into the oil for a half hour or so. The oil is cooled and filtered and the product obtained is the butter substitute stock which may be employed for making oleomargarin or various other fatty preparations melting at about the temperature of the butter or at least at such a temperature that they do not exhibit the greasy taste of lard. In making the butter substitute the oil may be mixed with a quantity of milk which has been allowed to sour under approved conditions and after churning the product is run into cold water and the fatty material separated, kneaded and allowed to ripen, then suitably packaged.

Cocoanut oil usually has a saponification value of about 257 and an iodin number of about 8, while palm kernel oil usually has a saponification value of 247 and an iodin number of about 13. Each of these oils has a low refractive index (about 35 and 37.5, respectively, for the common grades).

I, accordingly, designate these oils as distinguished from ordinary oils, by the expression "oil normally having an iodin number substantially below 25 and a saponification value above 240."

Cotton-seed oil has a saponification value around 192, an iodin value about 107 and a refractive index around 57. Peanut oil has a saponification value of about 189 to 194 and an iodin number about 83 to 100. It is accordingly to be noted that peanut oil and cotton-seen oil may be referred to as "an oil having a saponification value substantially below 200 and an iodin value substantially over 80."

Palm kernel oil and cocoanut oil may be considered as belonging to one class, and cotton-seed oil and peanut oil may be considered as belonging to a substantially different class, based on these differences.

What I claim is:—

1. The process of making an edible fat compound of a consistency substantially not less than butter nor substantially greater than lard which comprises co-hydrogenating a mixture of cocoanut oil and another vegetable oil in the presence of a finely divided nickel catalyzer to produce a substantially completely hydrogenated fat of the consistency aforesaid, filtering out the catalyzer, subjecting the fatty product to the action of superheated steam under reduced atmospheric pressure whereby the oil is deodorized and traces of nickel compounds are precipitated, and filtering out the latter.

2. A process which comprises mixing a plurality of oils together, in such proportions that on complete hydrogenation the consistency will be about that of ordinary butter, and then hydrogenating the mixture in the presence of a hydrogen-transferring catalyst, until the product is substantially completely hydrogenated.

3. The process of making hardened oil which comprises co-hydrogenating a mixture of fatty oils in the presence of a finely divided nickel catalyzer to produce a substantially completely hydrogenated fat, filtering out the catalyzer, subjecting the fatty product to the action of superheated steam whereby the oil is deodorized and traces of nickel compounds are precipitated.

4. The process which comprises incorporating hydrogenated cocoanut oil with a much smaller percentage of a substantially completely hydrogenated normally liquid oil.

5. Nut butter containing substantially completely hydrogenated cocoanut oil as its largest constituent, mixed with substantially completely hydrogenated normally liquid nut oil.

6. A nut butter containing substantially completely hydrogenated cocoanut oil, and substantially completely hydrogenated peanut oil, the former predominating.

7. A mixture of a plurality of substantially completely hydrogenated vegetable oils, the mixture having about the consistency of butter.

8. A process of making an edible product of a lard-like to butter-like consistency, which comprises hydrogenating a mixture containing a relatively large amount of an oil normally having a saponification value above 200 and an iodin number below 25 with a smaller amount of an oil having an iodin number above 80 and a saponification value below 200 in the presence of a nickel catalyzer until such mixture is substantially completely hydrogenated.

9. A mixture having a lard-like to butter-like consistency, such mixture containing a plurality of oils, one of such oils having, in its original state, an iodin number above 80 and a saponification value below 200, and another of such oils having, in its original state, an iodin number below 25 and a saponification value above 200; such oils being hydrogenated to a degree representing substantially complete saturation.

CARLETON ELLIS.